Figure 1:
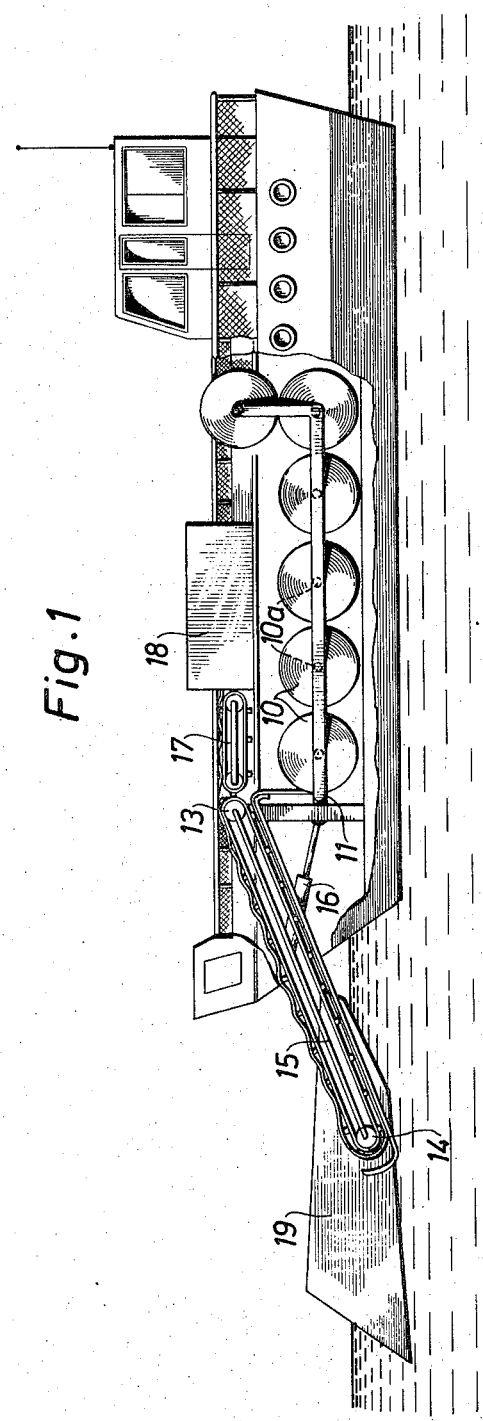

United States Patent [19]
Bergman

[11] 3,817,385
[45] June 18, 1974

[54] METHOD AND A DEVICE FOR COLLECTING SUBSTANCES FLOATING IN A LIQUID SURFACE

[76] Inventor: Hans Leopold Bergman, Vallatorg 81, Stockholm, Sweden

[22] Filed: Apr. 1, 1971

[21] Appl. No.: 130,300

[30] Foreign Application Priority Data
Apr. 13, 1970 Sweden.............................. 4994/70

[52] U.S. Cl............ 210/242, 210/401, 210/DIG. 21
[51] Int. Cl........................................... E02b 15/04
[58] Field of Search ............ 210/40, 242, 400, 401, 210/DIG. 21

[56] References Cited
UNITED STATES PATENTS

| | | | |
|---|---|---|---|
| 1,860,819 | 5/1932 | Schamberger............... | 210/DIG. 21 |
| 3,087,620 | 4/1963 | Hirs ............................... | 210/401 X |
| 3,314,545 | 4/1967 | Grabbe et al...................... | 210/242 |
| 3,617,552 | 11/1971 | Will et al........................ | 210/40 X |
| 3,617,555 | 11/1971 | Ginsburgh et al. ............. | 210/400 X |
| 3,630,891 | 12/1971 | Peterson et al............. | 210/DIG. 21 |

OTHER PUBLICATIONS
"Belts and Blotters to Clean Up Harbors," Machine Design, Vol. 39, No. 28, p. 46, (1967).

Primary Examiner—Samih N. Zaharna
Assistant Examiner—Thomas G. Wyse
Attorney, Agent, or Firm—Fred C. Philpitt

[57] ABSTRACT

A method and an apparatus for collecting substances floating in a liquid surface, especially oil and other sticky liquids in a water surface, using an endless, rotating conveyor band, one end of which being immersed in the liquid, and a collecting band, which is running from a supply down into the liquid and, resting on the conveyor band, up from the liquid, carrying with it substances floating in the liquid surface to a collecting device, receiving the collecting band and the substances transported on said band. Thus, substances in the liquid surface are lifted up from underneath and removed out of the liquid by the collecting band.

5 Claims, 4 Drawing Figures

METHOD AND A DEVICE FOR COLLECTING SUBSTANCES FLOATING IN A LIQUID SURFACE

The present invention relates to a method and a device for collecting substances floating in a liquid surface, especially oil and other sticky, more or less viscous liquids on a water surface.

In connection with the transport of large quantities of oil with tankers, ship disasters occur from time to time due to collisions and groundings, so that large quantities of oil flow out and congregate onto the water surface. These oil quantities may cause great damages on shores and coasts and must be taken care of or destroyed as soon as possible. Since tankers have a tendency of steadily increasing in dimensions, such ship disasters cause steadily larger consequences for the areas adjacent the location of the disaster. It is therefore of very great importance that the oil which flows out as a result of such ship disasters can be taken care of rapidly, so that the damages are limited. Occasionally, due to mistake or carelessness, waste oil is allowed to flow out from ships in connection with the cleaning of tanks, in which oil has previously been contained and in which rests of oil still remain. In such cases, too, great damages may be caused due to the outflow of oil and it is extremely important that the oil can be taken care of rapidly.

The main object of the present invention is to provide a method and a device for collecting solid or fluid substances, e.g., oil, floating on water or any other liquid. This object is obtained by the method and the device according to this invention.

The method according to the invention is characterized in that a collecting band of a flexible material is caused to run down into the liquid to a level below the liquid surface and then on a continuously rotating endless conveyor band up out of the liquid through the liquid surface, said collecting band lifting up from underneath and transporting the substances floating in the liquid surface so that they are carried up on the collecting band out of the liquid and further transferred to a device for receiving the collected substances and the band.

The device according to the invention comprises an endless conveyor band, which is adapted to be driven in a path over at least two spaced holding members and is characterized in that one part of the band conveyor is adapted to be immersed into the liquid and that members are provided for moving a flexible collecting band down into the liquid and to abutment against the endless conveyor band, said flexible collecting band being carried by the conveyor band during the driving thereof, so that the flexible collecting band abutting the conveyor band passes up through the liquid surface and by lifting from underneath carries with it substances floating in the liquid surface, and that another part of the band conveyor is arranged in connection with a collecting device for the collecting band and the substances transported on said collecting band.

The invention will be described more closely below with reference to the accompanying drawings.

Figure 2:
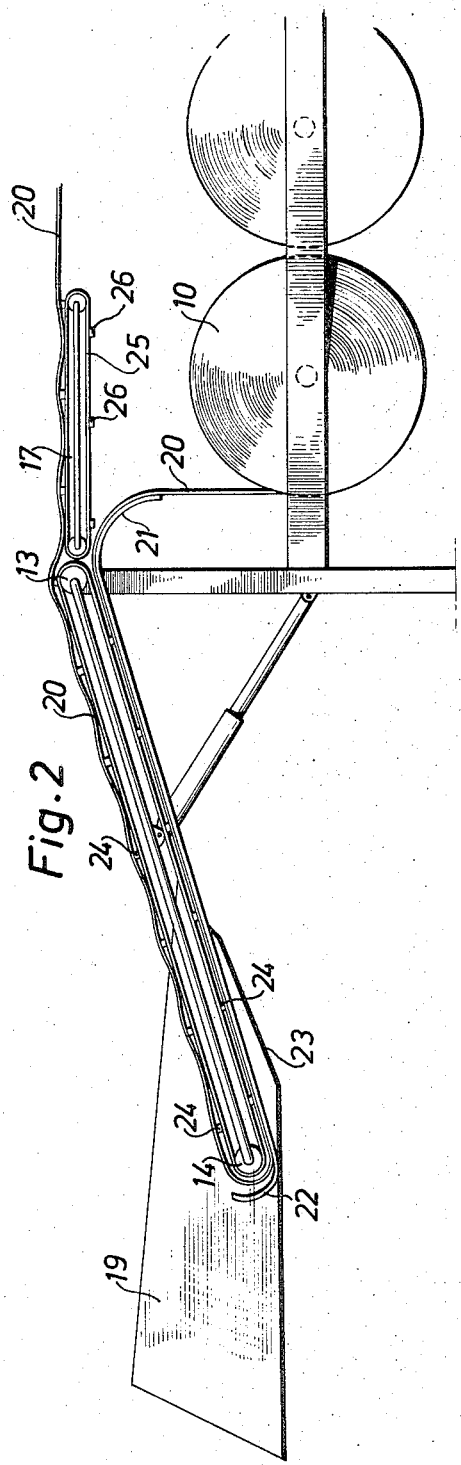
Figure 4:
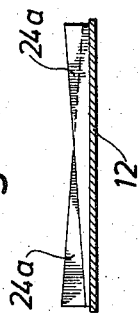
Figure 3:
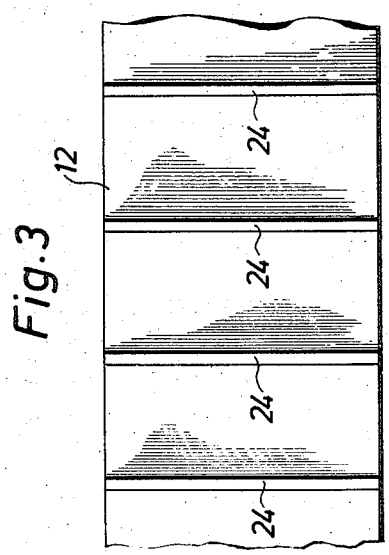

FIG. 1 shows a ship, which is provided with a collecting device according to the present invention. FIG. 2 shows, at a larger scale, the collecting device including a conveyor. FIG. 3 shows a top view of a portion of the conveyor included in the collecting device. FIG. 4 shows an arrangement of support ribs on the conveyor.

In FIG. 1 a ship is shown, which carries a collecting device according to the invention and which is provided with a supply of paper rolls 10. These paper rolls are arranged so that they can be successively moved to the collecting device and the shafts 10a of the rolls are then guided by guide rails 11 at the ends of the rolls. The collecting device comprises a conveyor 12 in the form of an endless band of a suitable material, which is adapted to run around two spaced rollers 13, 14 so as to form an elongated conveyor. The conveyor band may be driven conveniently by causing one of the rollers 13, 14 to rotate by means of a motor. The two rollers 13, 14 are mutually connected to a rigid assembly by means of a frame 15 so that one end of the conveyor, e.g., by means of an hydraulic actuating means 16, which is connected to the frame 15, can be placed in the water, while the other end of the conveyor is located adjacent a collecting table 17 or the like, which makes possible to transfer the material transported by means of the conveyor 12 to a collecting receptacle 18.

At its end immersed into the water, the conveyor frame is provided with two guide plates 19, arranged in V-form to guide floating substances on the water surface in a direction towards the conveyor.

FIG. 2 shows a collecting paper band 20 running from a supply roll 10, first over a curved guide plate 21 and then along the downmost side of the conveyor 12 and thereafter around the end of the conveyor immersed into the water and under abutment against the conveyor 12 up out of the water and back to the ship. At the collecting table 17 the paper band 20 leaves the conveyor 12 and is transported further into a collecting device. Thus, the conveyor will lift the oil which is floating on the water surface from underneath out of the water and transport said oil on the paper band on board the ship and into the collecting receptacle 18 provided.

The forward end of the conveyor is protected by means of a protective plate 22, which is provided at a certain distance in front of the conveyor without impeding its function. Between the guide plate 21 and the protective plate 22 a protective plate 23 extends, so as to protect the paper band during its immersion into the water and prevent the paper band from being subjected to excessive strain, if during the collecting operation the ship moves through the water.

The conveyor and the collecting table as well as the hydraulic positioning device have not been described and illustrated in detail in respect of the mechanical construction, since this mechanical detail structure does not form any part of the invention.

The hydraulic device 16 makes possible the positioning of the conveyor in a suitable angle relative the water surface. This angle, of course, is dependent of the conditions existing at the location where the collecting operation is performed and also dependent of the speed at which the conveyor is driven and the consistency of the oil. However, it should be convenient to position the conveyor band so that the transport direction, when the band leaves the water surface, forms an angle of between 15° and 60° with the water surface, preferably about 30°. It is also possible to give different parts of the conveyor a different inclination relative the water surface. The part closest to the water surface may then be given an inclination which is less than 15°, e.g., 5° or 10°.

As shown in FIG. 1 and 2 the conveyor is provided with ribs 24, which are secured to the conveyor band 12 and form right angles with the transport direction. These ribs 24 serve to facilitate the upwards transport of the oil from the water surface and to the collecting device by the formation of pockets in which the oil can be collected and transported upwards without the paper being subjected to excessive strain. It is preferably to let the ribs run from substantially one edge of the conveyor to the other edge, as shown in FIG. 3. It is also particularly preferably to form the ribs with a greater height at one conveyor band edge than at the other, as shown in FIG. 4, so that any water quantities which are transported up from the water surface together with the band and the oil can easily run off, before the paper and the oil adhering thereto arrive onboard the ship and into the collecting receptacle 18. These ribs 24a, FIG. 4, which are thus inclined from one conveyor band edge to the other may preferably be so arranged on the conveyor that they alternately are inclined in opposite directions, whereby the water runs off at both sides of the conveyor and no sliding transversely of the paper band can occur.

The collecting table 17 located on board the ship in connection with the conveyor is provided with a second conveyor 25, which is also provided with ribs 26. This conveyor facilitates the transfer of the paper band and the oil transported thereon to the collecting device 18.

When the collecting device is to be used for collecting oil on a water surface, one end of the conveyor is immersed into the water to a certain depth below the surface. Thereafter, a suppy roll of paper with a suitable width and a suitable strength, preferably wet strength paper, is positioned in place immediately adjacent the collecting device and, thereafter, the free end of the paper band is mounted, by means of a convenient securing means, on the conveyor band, immediately after the guide roller 13, located in connection with the collecting table 17, whereafter the conveyor 12 is started and permitted to run, until the forward end of the paper band has passed around the roller 14, immersed into the water, and has arrived back up to the roller 13, where the securing means for the paper band is opened, so that the paper band 20 can leave the conveyor band 12 and pass over to the collecting table 17 for further transport into the collecting receptacle 18. Thus, the paper band can be placed in position along the conveyor so as to start the collecting operation of the oil in an extremely simple manner. When the conveyor is caused to rotate continuously, the paper band is continuously fed out from the roll 10 along the conveyor down into the water, around the roller 14 and up out of the water under abutment against the conveyor and along the conveyor over the roller 13 and the collecting table 17 into the collecting receptacle 18. At the passage of the paper band through the water surface, the oil floating in the water surface adheres to the paper band and is lifted from underneath up out of the water and is carried by the paper band into the collecting receptacle 18. Due to the fact that the conveyor is provided with transverse ribs, the band forms a plurality of pockets, in which large quantities of oil can be collected and transported into the collecting receptacle without the paper being subjected to excessive strain.

The paper band and the conveyor band are preferably provided with holes or slots to facilitate the water drain. The holes in the paper band can have a diameter of e.g., 10–15 millimeters with a distance between the holes of about 10 centimeters. The conveyor band is preferably made of net.

During the collecting operation, the ship may either move forwards or be at rest in the oil belt. In the latter case the oil is successively drawn inwardly towards the ship due to the inherent adhering capability of the oil. The speed of the conveyor can then easily be adapted to the supply of the oil and to the other conditions existing at the place of collection. If the ship is moving forwards through the oil belt with the collecting arms positioned at both sides of the collecting path, the oil is to a certain extent pushed forwards but by means of a suitable adaption of the rotary speed of the conveyor, this inconvenient effect on the collection of the oil is completely compensated.

If desired, the collecting receptacle 18 may communicate with an additional collecting receptacle in the interior of the ship for the transfer of the collected oil and the collected paper band. It is also possible to arrange the collecting receptacle 18 easily replacable so that a new and empty receptacle can be inserted, each time the collecting receptacle in use has been filled. Filled receptacles may then either be collected on board or via other ships transported to some other location. It is, of course, also possible to place the collecting receptacle 18 directly on an adjacent ship so as to facilitate the transport away, as soon as the receptacle has been filled.

The method has the great advantage that the oil is collected and is thus completely removed from the water. As is well known, such a removal is not performed with the prior known methods including burning of the oil on the water or pouring out heavy particles so as to draw the oil down into the water. In addition, by the utilization of the paper band the advantage is obtained that the oil has no opportunity to adhere to the conveyor. The presence of the conveyor brings about the advantage that the paper band is not subjected to excessive strain and that, therefore, sufficiently strong and durable paper bands may be provided at a low cost.

The present invention has been described above in connection with the collection of oil on water but it is evident that the same method and the same device could also be used for collecting a plurality of other substances and also in other liquids than water. It is, of course, also evident that in such cases the collecting device and the supply rolls could be placed elsewhere than on board a ship, e.g., on basin edges or the like. While in the exemplary embodiment described above paper has been mentioned as the band material, it is evident that also other materials may be used, e.g., plastic. The device proper may, of course, also be modified in many various ways within the scope of the idea of invention. However, the important feature is that the substances floating in the liquid by means of the moving flexible band of paper or other suitable material are lifted upwardly from underneath out of the liquid and thereafter transported on the flexible band into a collecting receptacle. If the flexible band in one manner or the other is relieved from oil, the same band can be used several times and, if desired, also be formed as an endless band.

I claim:

1. A device for removing substances floating on a water surface, comprising:
   a. an endless conveyor band positioned at an acute angle with respect to said water surface with the lower end of the conveyor band below the water surface and the upper end of the conveyor band being disposed above said water surface,
   b. means for driving said conveyor band,
   c. an elongated paper collecting sheet,
   d. means for feeding said paper collecting sheet around the exterior of said conveyor band and in close proximity thereto from the point that the conveyor band enters the water until the conveyor band leaves the water,
   e. means for separating said collecting sheet from proximity with said conveyor band at a point above said water level,
   f. receiving means for receiving said collecting sheet after it has been separated from said conveyor band,
   g. said conveyor band being provided with transport ribs on its outer surface so as to form pockets on the conveyor band,
   h. said paper collecting sheet and said conveyor band being provided with holes to facilitate drainage of water.

2. The device of claim 1 wherein the receiving means comprises a table adjacent the upper portion of the conveyor band path and means for guiding the paper web over said table for further transportation to a receiving means.

3. The device of claim 2 wherein said table is provided with an endless continuously rotatable conveyor band for facilitating the transportation of the paper band and the collected substances into the receiving means.

4. The device of claim 1 wherein the ribs extend substantially from one edge of the conveyor band to the opposite endge and have a greater height at one edge of the conveyor band than at the other edge, so that the water accompanying the paper band and the oil runs off.

5. The device of claim 4 wherein a number of the ribs are inclined towards one edge of the conveyor band and a number of the ribs are inclined towards the opposite edge of the conveyor band.

* * * * *